(12) United States Patent
An et al.

(10) Patent No.: US 8,104,946 B2
(45) Date of Patent: Jan. 31, 2012

(54) BACKLIGHT ASSEMBLY AND DISPLAY DEVICE HAVING THE SAME

(75) Inventors: Jun Seok An, Suwon-si (KR); Jong Cheol Lee, Suwon-si (KR); Dae Hyoun Byoun, Seoul (KR); Tae Jun You, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/173,176

(22) Filed: Jul. 15, 2008

(65) Prior Publication Data

US 2009/0147500 A1    Jun. 11, 2009

(30) Foreign Application Priority Data

Dec. 7, 2007  (KR) .................. 10-2007-0127122

(51) Int. Cl.
    *F21V 21/00* (2006.01)
(52) U.S. Cl. .................... 362/634; 362/217.09; 362/225
(58) Field of Classification Search ................. 362/600, 362/614, 630, 631, 632, 633, 634, 217.08, 362/217.09, 217.11, 217.12, 217.13, 217.15, 362/217.16, 217.17, 225, 260
    See application file for complete search history.

(56) References Cited

U.S. PATENT DOCUMENTS

| | | | |
|---|---|---|---|
| 7,057,678 B2 | 6/2006 | Ishida et al. | |
| 7,397,460 B2 * | 7/2008 | Yeo et al. ................. | 345/102 |
| 2004/0257793 A1 * | 12/2004 | Wakabayashi ................. | 362/31 |
| 2005/0265020 A1 * | 12/2005 | Kim ................. | 362/225 |
| 2006/0061982 A1 * | 3/2006 | Lee ................. | 362/29 |
| 2006/0291190 A1 * | 12/2006 | Tsai ................. | 362/97 |
| 2007/0002563 A1 * | 1/2007 | Tseng ................. | 362/225 |
| 2007/0041217 A1 | 2/2007 | Kim et al. | |
| 2007/0139911 A1 * | 6/2007 | Yang et al. ................. | 362/225 |
| 2008/0002392 A1 * | 1/2008 | Kim ................. | 362/97 |

FOREIGN PATENT DOCUMENTS

| | | |
|---|---|---|
| EP | 1860377 | 11/2007 |
| EP | 1900997 | 3/2008 |
| JP | 08-045327 | 2/1996 |
| JP | 2002-311418 | 10/2002 |
| JP | 2006-344602 | 12/2006 |
| JP | 2007-214043 | 8/2007 |
| JP | 2007-317664 | 12/2007 |
| KR | 2007-68717 | 7/2007 |
| MX | 2009005545 | 8/2009 |
| WO | 2007/007621 | 1/2007 |

OTHER PUBLICATIONS

International Search Report dated Feb. 20, 2009 in PCT/KR2008/004815.
Chinese Office Action issued Jan. 22, 2010 in CN Application No. 2008101353791.
Mexican office action issued on Dec. 2, 2010 in MX application No. MX/A/2008/009576.

* cited by examiner

*Primary Examiner* — Y My Quach Lee
(74) *Attorney, Agent, or Firm* — Stanzione & Kim, LLP (57) ABSTRACT

A backlight assembly, in which several parts are unified so as to reduce a number of parts used and simplify an assembly process includes lamps emitting light, first lamp sockets, each of which includes a first connection member coupled with one end of each of the lamps so as to be electrically connected to the end of each of the lamps, and a reflection plate to reflect the light emitted from the lamps, and including socket fixing units formed integrally therewith to respectively fix the first lamp sockets. Each of the socket fixing units includes a socket fixing groove formed on a bottom plane of the reflection plate.

21 Claims, 12 Drawing Sheets

FIG. 1

(CONVENTIONAL)

BACKLIGHT ASSEMBLY AND DISPLAY DEVICE HAVING THE SAME

CROSS-REFERENCE TO RELATED APPLICATIONS

This application claims priority under 35 U.S.C. §119(a) from Korean Patent Application No. 2007-0127122, filed Dec. 7, 2007, in the Korean Intellectual Property Office, the disclosure of which is incorporated herein in its entirety by reference.

BACKGROUND OF THE INVENTION

1. Field of the Invention

The present general inventive concept relates to a display device, and more particularly, to a backlight assembly, in which a number of parts used is minimized, and a display device having the same.

2. Description of the Related Art

Liquid crystal displays are devices, which display a desired image by regulating light transmittance of light crystal cells arranged in a matrix shape. Each of liquid crystal displays includes a liquid crystal panel forming unit pixels, and a backlight assembly irradiating light onto the liquid crystal panel.

Figure 1:
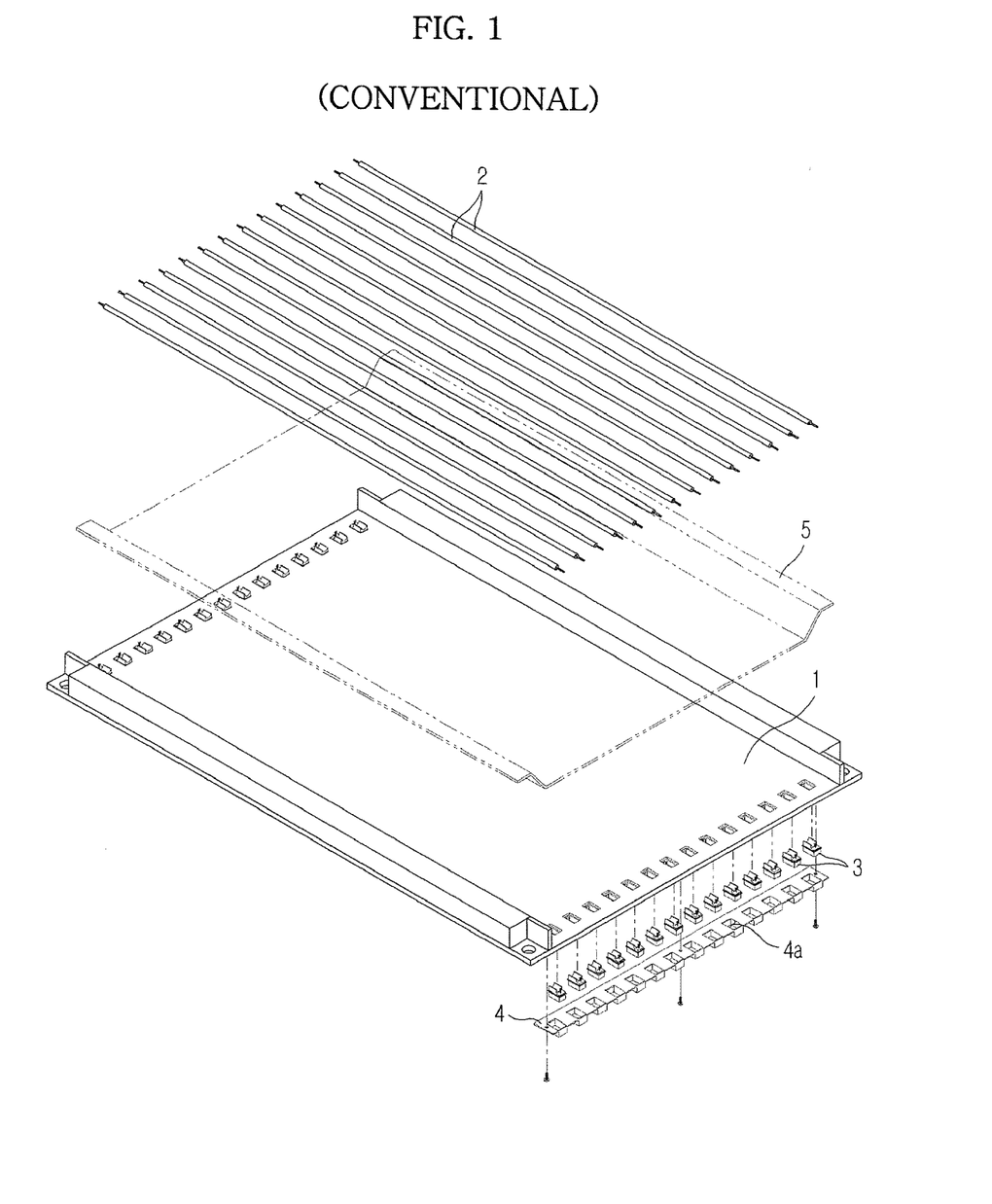
FIG. 1 is a perspective view illustrating a portion of a conventional backlight assembly.

FIG. 1 is a perspective view illustrating a portion of a conventional backlight assembly. As illustrated in FIG. 1, the conventional backlight assembly includes a bottom chassis 1 made of a metal, and a lamp assembly assembled with the bottom chassis 1.

The lamp assembly includes lamps 2 arranged in a row on the bottom chassis 1, lamp sockets 3 respectively supporting ends of the lamps 2, and socket housings 4 receiving the lamp sockets 3. The lamp sockets 3 are respectively fixed to socket assembly units 4a formed on the socket housings 4, and the socket housings 4 are assembled with a rear surface of the bottom chassis 1 through separate fastening members, such as screws. Here, the lamp sockets 3 are protruded toward a front surface of the bottom chassis 1 through openings formed through the bottom chassis 1, and both ends of the lamps 2 are respectively connected to the lamp sockets 3.

A reflection plate 5 is disposed on the lower surfaces of the lamps 2 placed on the bottom chassis 1. The reflection plate 5 reflects light emitted from the lamps 2 forward.

However, the above-stated conventional backlight assembly requires the reflection plate, the socket housings, and the fastening members to fix the socket housings, separately from the bottom chassis, thus increasing the number of parts used. Further, the conventional backlight assembly requires a step of assembling the socket housings with the bottom chassis, thus being unfavorable for shortening an assembly process and increasing the productivity of a product.

SUMMARY OF THE INVENTION

The present general inventive concept provides a backlight assembly, in which several parts are unified so as to reduce a number of parts used and simplify an assembly process, and a display device having the same.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may be achieved by providing a backlight assembly including lamps emitting light, first lamp sockets, each of which includes a first connection member coupled with one end of each of the lamps so as to be electrically connected to the end of each of the lamps, and a reflection plate reflecting the light emitted from the lamps, and including socket fixing units formed integrally therewith for respectively fixing the first lamp sockets.

The reflection plate may be formed by injection molding using a resin having light reflectivity.

Each of the socket fixing units may include a socket fixing groove formed on the bottom plane of the reflection plate.

Each of the first lamp sockets may include a connection groove located within the socket fixing groove, and the socket fixing groove may include a slot to expose the connection groove to the outside.

The backlight assembly may further include a substrate disposed on the rear surface of the reflection plate for supplying power to the lamps, wherein the substrate includes connection protrusions, each of which is inserted into the connection groove through the slot of the socket fixing groove and thus is electrically connected to the first connection member.

Each of the lamps may include a U-shaped bending portion, and lamp guide units, each of which guides the bending portion, may be formed integrally with the reflection plate.

The backlight assembly may further include lamp fixing members, each of which prevents the movement of the bending portion.

The backlight assembly may further include a ground plate disposed on the rear surface of the reflection plate to ground the lamps, wherein the ground plate includes connection protrusions, each of which is inserted into the connection groove through the slot of the socket fixing groove and thus is electrically connected to the first connection member.

The backlight assembly may further include a ground member disposed on the bottom plane of the reflection plate, and second lamp sockets, each of which includes a second connection member having one end electrically connected to the other end of each of the lamps and the other end electrically connected to the ground member.

The ground member may include an extension portion extended to the outside of the reflection plate.

The foregoing and/or other aspects and utilities of the general inventive concept may also be achieved by providing a display device including a front cover, a liquid crystal panel disposed at the rear of the front cover, lamps irradiating light onto the liquid crystal panel, first lamp sockets, each of which is connected to one end of each of the lamps, to support the lamps, a reflection plate including a bottom plane reflecting the light emitted from the lamps toward the liquid crystal panel, and socket fixing units formed integrally with the bottom plane to fix the first lamp sockets, and a rear cover disposed at the rear of the reflection plate.

The reflection plate may be formed by injection molding using a resin having light reflectivity.

Each of the socket fixing units may include a socket fixing groove formed at one side of the edge of the bottom plane.

The display device may further comprise a ground member disposed at the other side of the edge of the bottom plane and electrically connected to the other end of each of the lamps.

A through hole may be formed through the reflection plate so that the ground member can be extended to the outside of the reflection plate via the through hole.

The foregoing and/or other aspects and utilities of the general inventive concept may also be achieved by providing a backlight assembly usable with a display device, the backlight assembly including lamps to emit light, a reflection plate to reflect light emitted from the lamps, and lamp guide units integrally formed with the reflection plate to guide a portion of the lamps.

The backlight assembly may further include a grounding unit formed on the reflection plate to ground the lamps.

BRIEF DESCRIPTION OF THE DRAWINGS

These and/or other aspects and utilities of the present general inventive concept will become apparent and more readily appreciated from the following description of the embodiments, taken in conjunction with the accompanying drawings in which.

DETAILED DESCRIPTION OF THE PREFERRED EMBODIMENTS

Reference will now be made in detail to embodiments of the present general inventive concept, an example of which is illustrated in the accompanying drawings, wherein like reference numerals refer to like elements throughout. The embodiments are described below to explain the present general inventive concept by referring to the annexed drawings.

Figure 2:
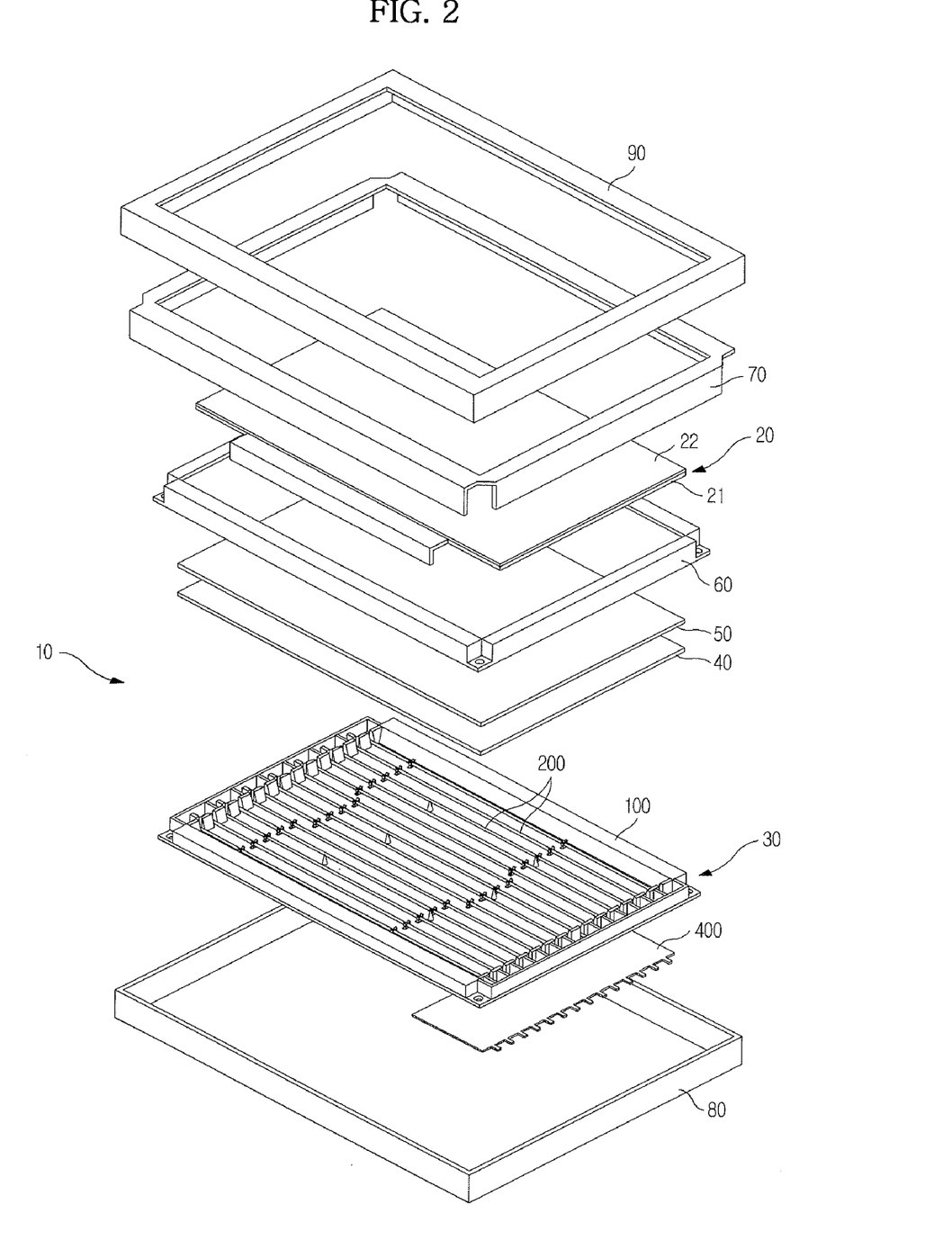
FIG. 2 is a perspective view illustrating a display device in accordance with an embodiment of the present general inventive concept.

FIG. 2 is a perspective view illustrating a display device in accordance with an embodiment of the present general inventive concept.

As illustrated in FIG. 2, a display device 10 includes a liquid crystal panel 20 to display an image using a liquid crystal, and a backlight assembly 30 to irradiate light onto the liquid crystal panel 20.

The liquid crystal panel 20 includes a thin film transistor (hereinafter, referred to as "TFT") substrate 21, a color filter substrate 22 being opposite to the TFT substrate 21, and a liquid crystal layer (not illustrated) injected into a space between the TFT substrate 21 and the color filter substrate 22.

The liquid crystal panel 20 regulates transmittance of the light irradiated from the backlight assembly 30, and thus displays an image.

Optical sheets to improve the optical characteristics of the light irradiated from the backlight assembly 30 are disposed between the liquid crystal panel 20 and the backlight assembly 30. The optical sheets may include a diffusion plate 40 and a light-converging sheet 50. The diffusion plate 40 diffuses the light irradiated from the backlight assembly 30, and thus improves uniformity in brightness. The light-converging sheet 50 arranges a direction of the light so that the light diffused by the diffusion sheet 40 can be incident perpendicularly onto the liquid crystal panel 20.

A middle mold 60 is disposed between the liquid crystal panel 20 and the light-converging sheet 50. The optical sheets including the diffusion plate 40 and the light-converging sheet 50 are supported between the middle mold 60 and the backlight assembly 30. Further, a top chassis 70 is disposed in the front of the liquid crystal panel 20, and the liquid crystal panel 20 is supported between the top chassis 70 and the middle mold 60.

A rear cover 80 is disposed at the rear of the backlight assembly 30, and a front cover 90 connected with the rear cover 80 is disposed in the front of the top chassis 70.

Figure 3:
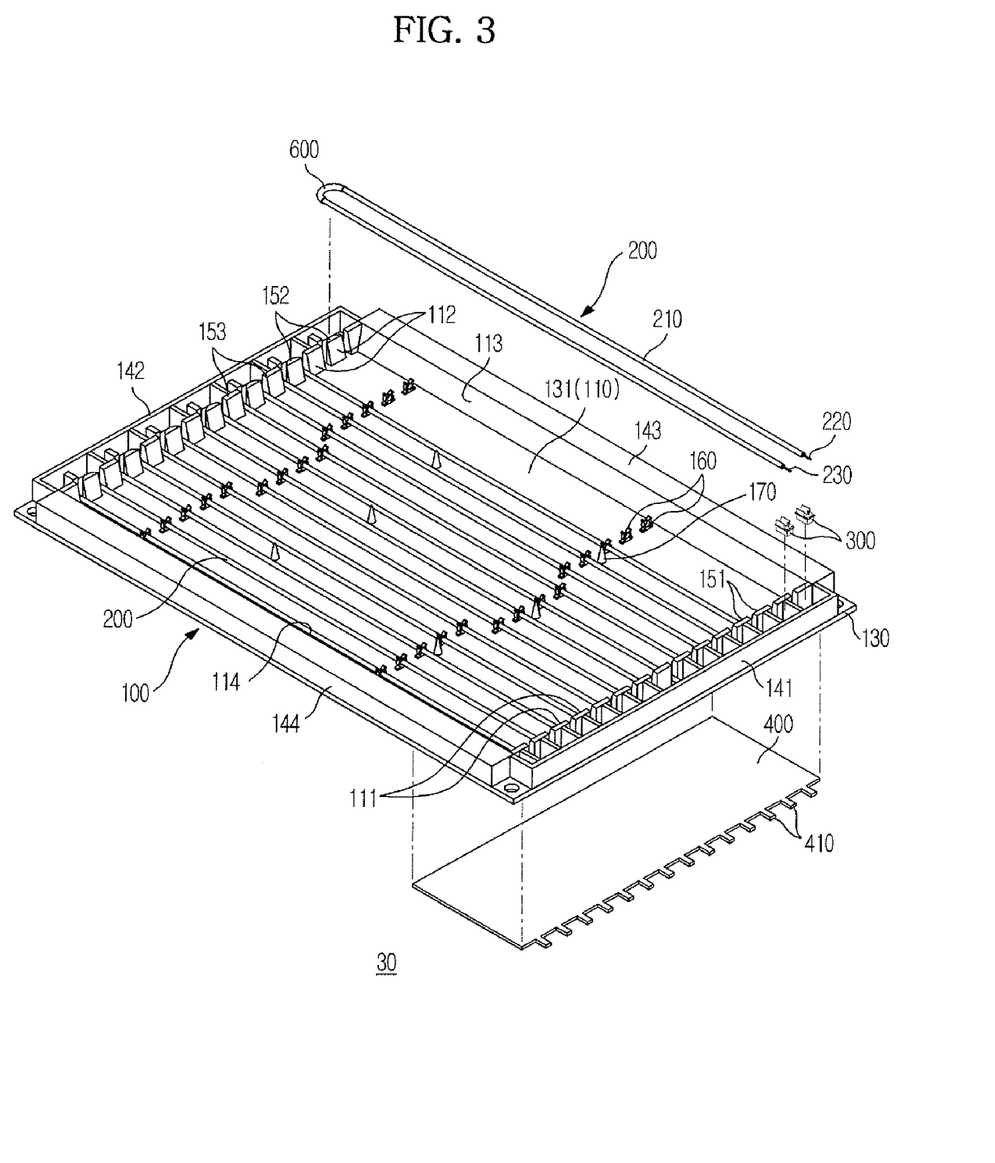
FIG. 3 is a perspective view illustrating a backlight assembly in accordance with an embodiment of the present general inventive concept.
Figure 4:
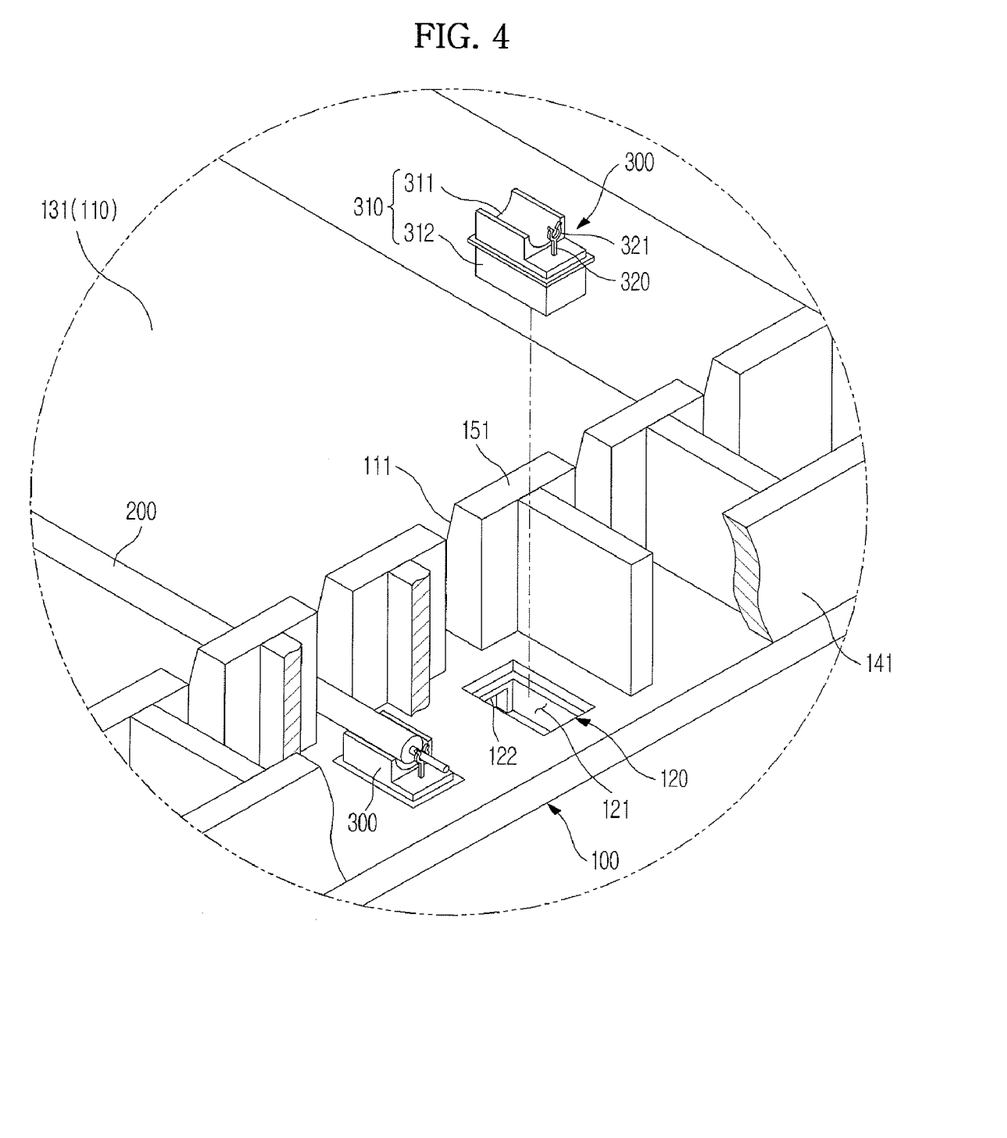
FIG. 4 is an enlarged perspective view illustrating a portion of the backlight assembly of FIG. 3.

FIG. 3 is a perspective view illustrating a backlight assembly in accordance with an embodiment of the present general inventive concept, and FIG. 4 is an enlarged perspective view illustrating a portion of the backlight assembly of FIG. 3.

As illustrated in FIGS. 2 to 4, the backlight assembly 30 includes a reflection plate 100, lamps 200 arranged on the reflection plate 100, and first lamp sockets 300 respectively connected to both ends of the lamps 200.

A reflection unit 110 reflecting light emitted from the lamps 200 toward the liquid crystal panel 20, and socket fixing units 120, to which the first lamp sockets 300 are fixed, are formed integrally with the reflection plate 100. That is, the reflection plate 100 serves both as a reflecting member to converge light on the liquid crystal panel 20 and a socket fixing member to fix the first lamp sockets 300.

The reflection plate 100 is produced by injecting molding using a resin having a good light reflectivity. The reflection plate 100 is produced by injecting molding, thereby easily forming socket fixing units 120 and other desired structures thereon.

Further, the reflection plate 100 is produced by injection molding using a material obtained by adding glass fiber to polycarbonate. When glass fiber is added to polycarbonate, the thermal expansion coefficient of the obtained injection molded product is reduced, and thus the thermal deformation of the reflection plate is reduced. The injection molding characteristics become excellent, and thus a generation of potential problems in the injection molding is reduced. Further, the rigidity of the reflection plate 100 is enhanced. Thus, preventing the reflection plate 100 from being deformed or components mounted in the reflection plate 100 from being broken due to an external impact is possible.

A ratio of the glass fiber added to the poly carbonate, for example, is in a range of 10% to 20%. When the ratio of the glass fiber added to the poly carbonate is below 10%, the effect of the glass fiber added to the polycarbonate is insignificant, and when the ratio of the glass fiber added to the poly carbonate is over 20%, mass productivity in the injection molding is lowered.

The reflection plate 100 includes a bottom plate 130 and first to fourth side walls 141, 142, 143, and 144 respectively protruded from four sides of the bottom plate 130, thus forming a designated receiving space therein.

First supporting members 151 are disposed along the first side wall 141 within the first side wall 141. The first supporting members 151 are disposed at regular intervals so as to form channels to pass the lamps 200. Second supporting members 152 and third supporting members 153 are alternately disposed along the second side wall 142 within the second side wall 142. The second supporting members 152 and the third supporting members 153 are disposed at regular intervals so as to form channels to pass the lamps 200.

The optical sheets 40 and 50 are placed on the first supporting members 151, the second supporting members 152, the third supporting members 153, the third side wall 143, and the fourth side wall 144. Accordingly, the first to third supporting members 151,152, and 153, and the third and fourth side walls 143 and 144 may have a same height.

The reflection unit 110 of the reflection plate 100 includes the front surface of the bottom plate 130, i.e., a bottom plane 131, and first to fourth side reflection surfaces 111,112, 113, and 114, which are formed outside the bottom plane 131. The first reflection surfaces 111 (with reference to FIG. 4) are downward inclined from protruded upper surfaces of the first supporting members 151 to the bottom plane 131. The second reflection surfaces 112 are downward inclined from the upper surfaces of the second and third supporting members 152 and 153 to the bottom plane 131. The third and fourth reflection surfaces 113 and 114 are inclined from the upper surfaces of the third and fourth side walls 143 and 144 to the bottom plane 131.

Lamp supporters 160 to support the lamps 200 and support bosses 170 to support the optical sheets 40 and 50 placed on the reflection plate 100 may be formed integrally with the bottom plane 131 of the reflection plate 100.

As illustrated in FIGS. 2 and 3, the lamps 200 are arranged in a row on the bottom plate 130. Each of the lamps 200 includes a lamp body 210, and a first electrode portion 220 and a second electrode portion 230 provided at ends of the lamp body 210. In this embodiment, the lamps 200 are U-shaped lamps, and each of the lamps 200 further includes a U-shaped bending portion 211 (with reference to FIG. 6). The bending portion 211 is located close to the second side wall 142 of the reflection plate 100. The first and second electrode portions 220 and 230 neighbor each other, and are located close to the first side wall 141 of the reflection plate 100.

Figure 5:
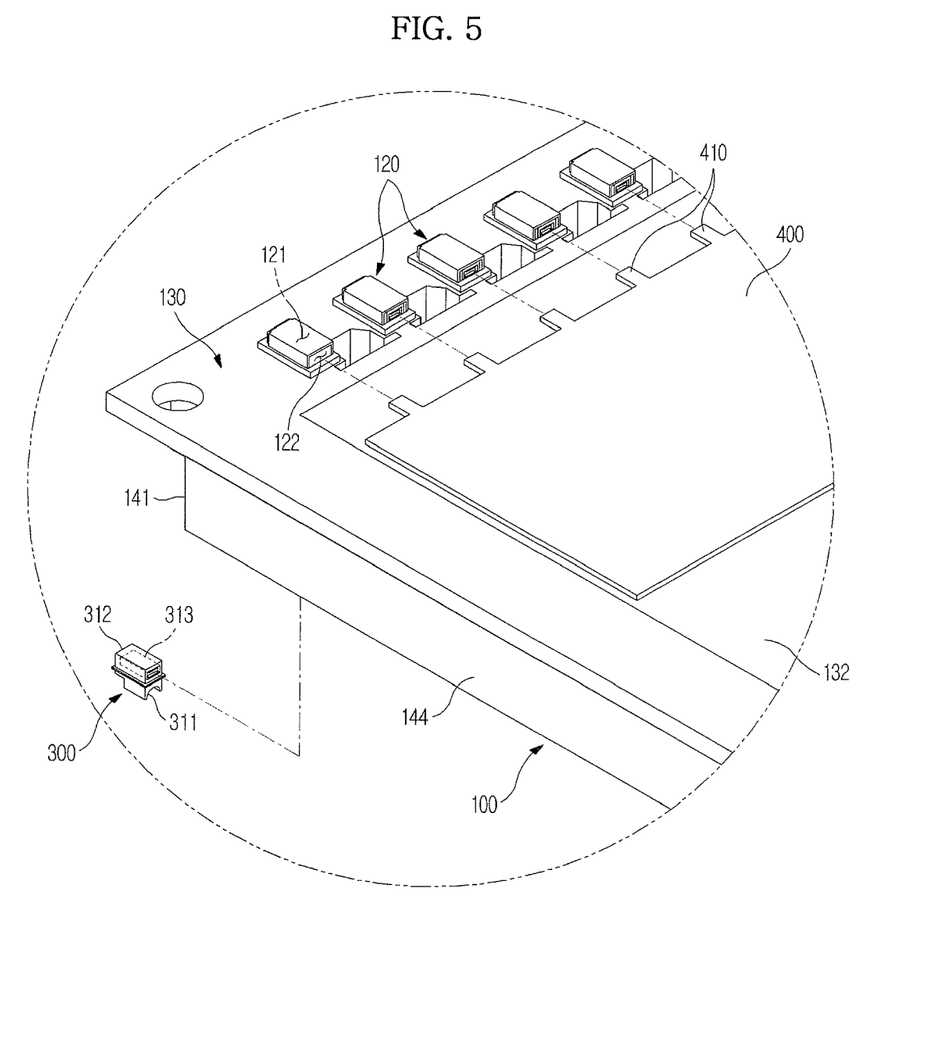
FIG. 5 is an enlarged perspective view illustrating a rear surface of a reflection plate, first lamp sockets, and a power supply substrate in the backlight assembly in accordance with the embodiment illustrated in FIG. 3.

FIG. 5 is an enlarged perspective view illustrating a rear surface of the reflection plate, the first lamp sockets, and a power supply substrate in the backlight assembly in accordance with an embodiment of the present general inventive concept.

As illustrated in FIGS. 3 to 5, the socket fixing units 120 are located close to the first side wall 141. Each of the socket fixing units 120 includes a socket fixing groove 121 formed integrally with the bottom plane 131 of the reflection plate 100. The socket fixing grooves 121 are concaved on the bottom plane 131 of the reflection plate 100, and thus a rear surface 132 of the reflection plate 100 is protruded backward corresponding to the socket fixing grooves 121. Each of the socket fixing grooves 121 is provided with a slot 122 opened toward the rear surface 132 of the reflection plate 100.

The first lamp sockets 300 are respectively inserted into the corresponding socket fixing grooves 121, and are connected to the corresponding lamps 200, thus supporting the lamps 200. Each of the first lamp sockets 300 includes a socket body 310, and a first connection member 320 disposed on the socket body 310.

The socket body 310 includes a lamp receipt portion 311 to receive the end of the lamp 200 to support the lamp 200, a connection portion 312 fitted into the socket fixing groove 121, and a connection groove 313 formed inside the connection portion 312. When the connection portion 312 is inserted into the socket fixing groove 121, the lamp receipt portion 311 is protruded upward from the bottom plane 131, and an inlet of the connection groove 313 is exposed to the outside of the socket fixing groove 121 through the slot 122 of the socket fixing groove 121.

The first connection member 320 is made of a conductive material. One end of the first connection member 320 is protruded close to the lamp receipt portion 311 and is connected to the first electrode portion 220 or the second electrode portion 230 of the lamp 200, thus being electrically connected to the lamp 200. That is, the end of the first connection member 320 is defined as a connection portion 321 connected to the first electrode portion 220 or the second electrode portion 230 of the lamp 200. The connection portion 321 has a loop shape, which is partially opened so as to easily fix the first electrode portion 220 or the second electrode portion 230 of the lamp 200. The other end of the first connection member 320 is extended to the connection groove 313, and is exposed to an inside of the connection groove 313. An other end of the first connection member 320 is defined as a terminal portion (not illustrated), and is electrically connected to a power supply substrate 400, which will be described later.

As illustrated in FIG. 5, the power supply substrate 400, which applies a driving voltage to the lamps 200 (FIG. 6), is mounted on the rear surface 132 of the reflection plate 100. Although not illustrated in the drawing, a conductive pattern, which is insulated from the outside, is formed on the power supply substrate 400, and an inverter, which applies a lamp driving voltage to the conductive pattern, is disposed on the power supply substrate 400.

The power supply substrate 400 includes connection protrusions 410 electrically connected to the conductive pattern. The connection protrusions 410 are prepared in the plural number corresponding to the first lamp sockets 300. The connection protrusions 410 are respectively inserted into the connection grooves 313 of the first lamp sockets 300 through the slots 122 of the socket fixing grooves 121, and are electrically connected to the terminal portions (not illustrated) of the first connection members 320 within the connection grooves 313. Accordingly, the lamp driving voltage output from the inverter of the power supply substrate 400 is applied to the lamps 200 through the first connection members 320.

Figure 6:
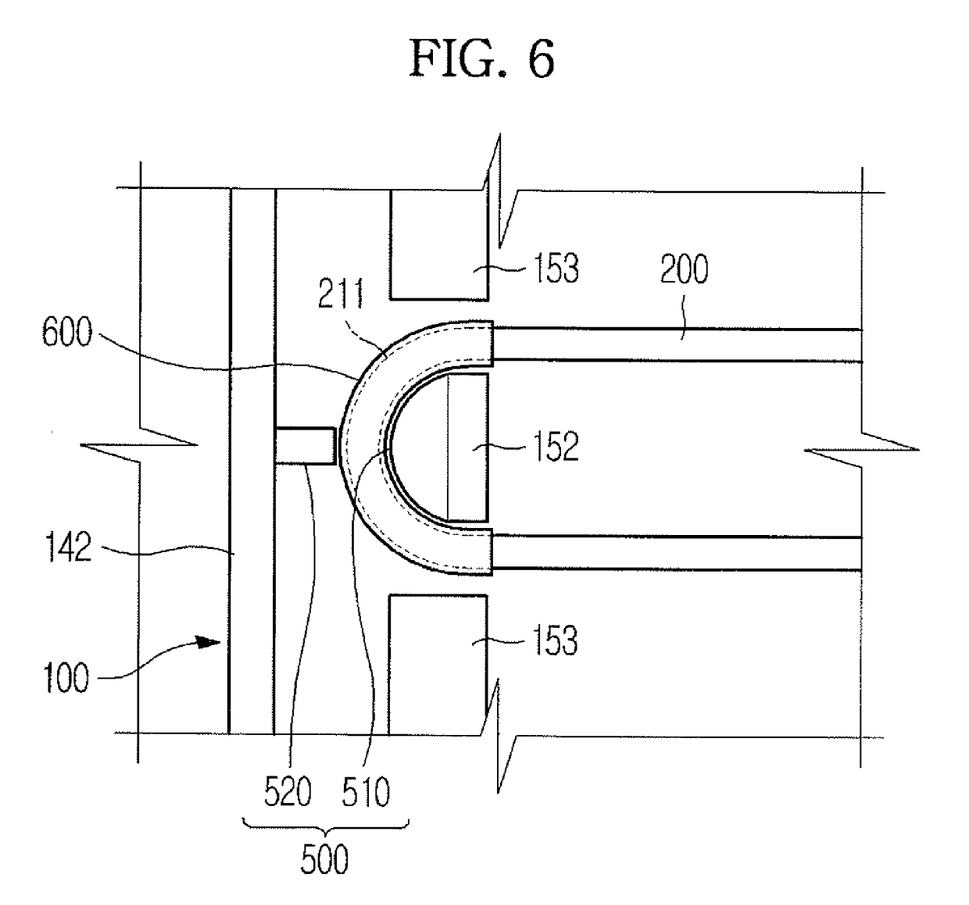
FIG. 6 is an enlarged plan view illustrating a portion of the backlight assembly of FIG. 3.

FIG. 6 is an enlarged plan view illustrating a portion of the backlight assembly of FIG. 3. As illustrated in FIGS. 3 and 6, the backlight assembly 30 further includes lamp guide units 500, which respectively guide the bending portions 211 of the corresponding lamps 200. The lamp guide units 500 are formed integrally with the reflection plate 100 without any additional part.

Each of the lamp guide units 500 includes a lamp guide plane 510 formed on the second supporting member 152 so as to have a shape corresponding to that of the bending portion 211 of the lamp 200, and a lamp fixing protrusion 520 formed on the second side wall 142 so as to be opposite to the lamp guide plane 510. The bending portion 211 of the lamp 200 is disposed between the lamp guide plane 510 and the lamp fixing protrusion 520. The lamp guide plane 510 guides an inner side of the bending portion 211, and the lamp fixing protrusion 520 guides an outer side of the bending portion 211.

The backlight assembly 30 further includes lamp fixing members 600, which respectively protect the bending portions 211 of the lamps 200 and prevent movement of the bending portions 211. As illustrated in FIG. 6, the lamp fixing members 600 may be rubber bands inserted into the bending portions 211 of the lamps 200.

Figure 7:
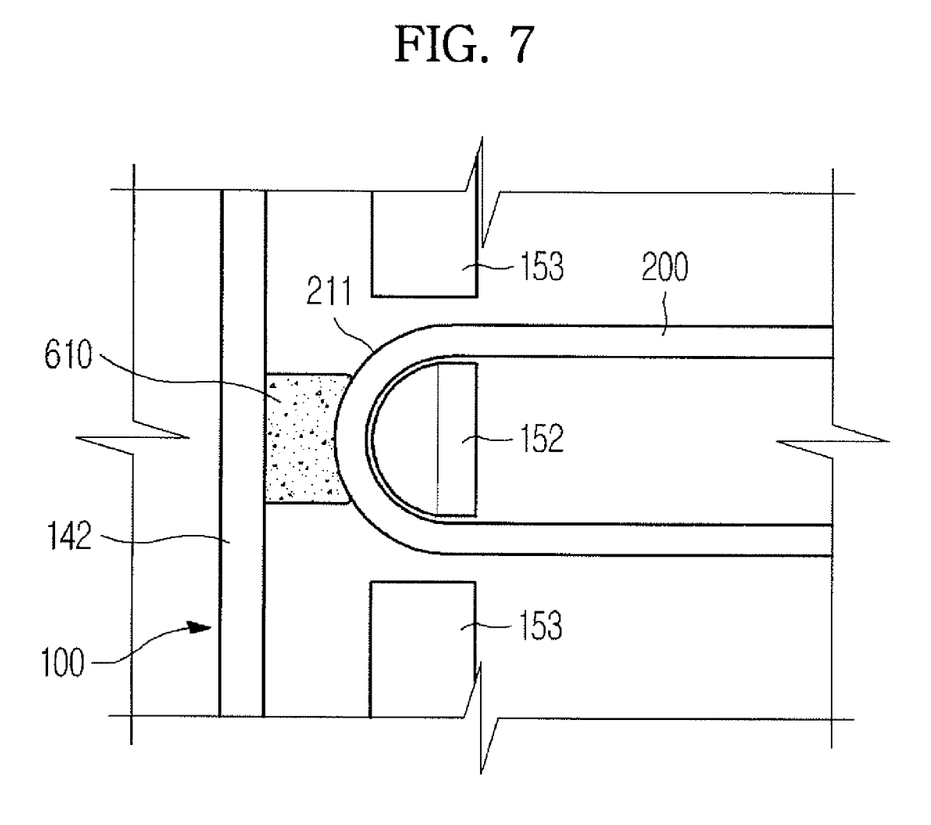
FIG. 7 is a plan view illustrating a variation of a lamp fixing member of FIG. 6.

FIG. 7 is a plan view illustrating a variation of the lamp fixing member 610 of FIG. 6. As illustrated in FIG. 7, the backlight assembly 30 may include lamp fixing members 610, which are respectively disposed between the second side wall 142 of the reflection plate 100 and the bending portions 211 of the lamps 200. The lamp fixing members 610 are made of an elastic material, such as rubber or sponge.

Figure 8:
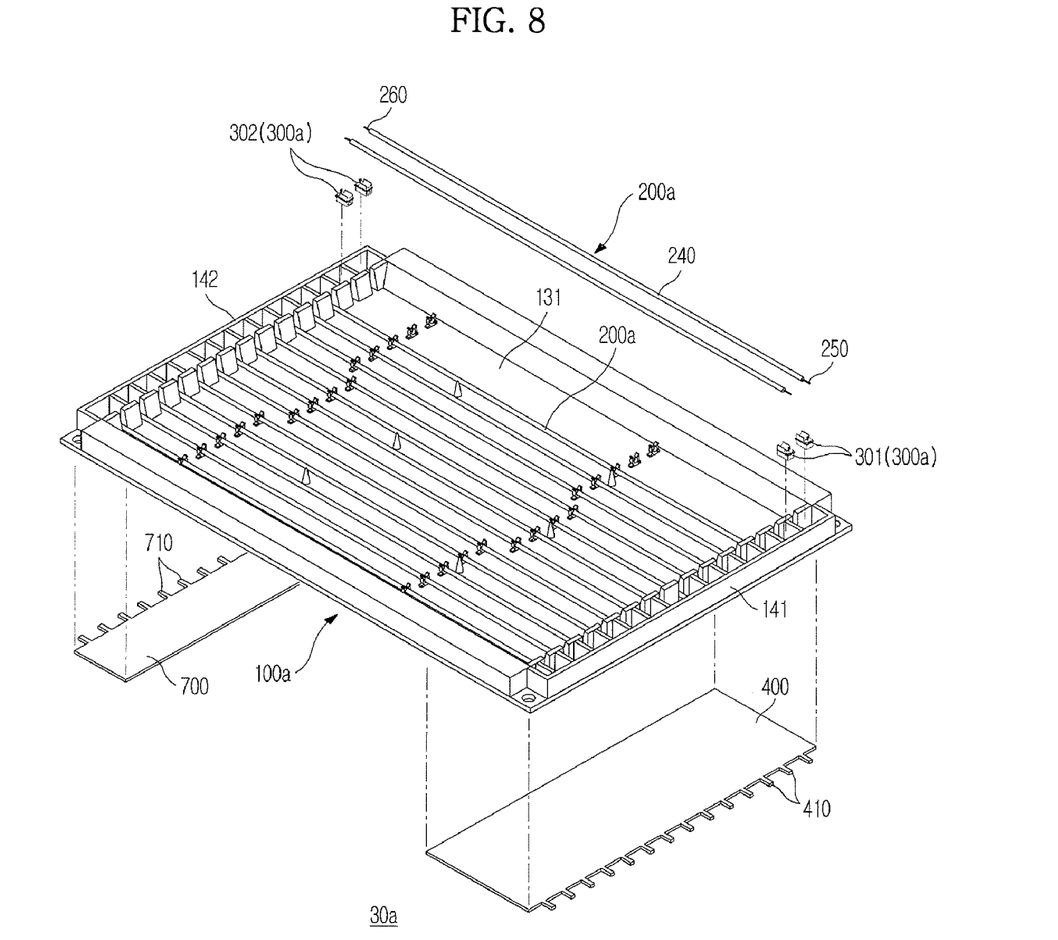
FIG. 8 is a perspective view of a backlight assembly in accordance with a second embodiment of the present general inventive concept.
Figure 9:
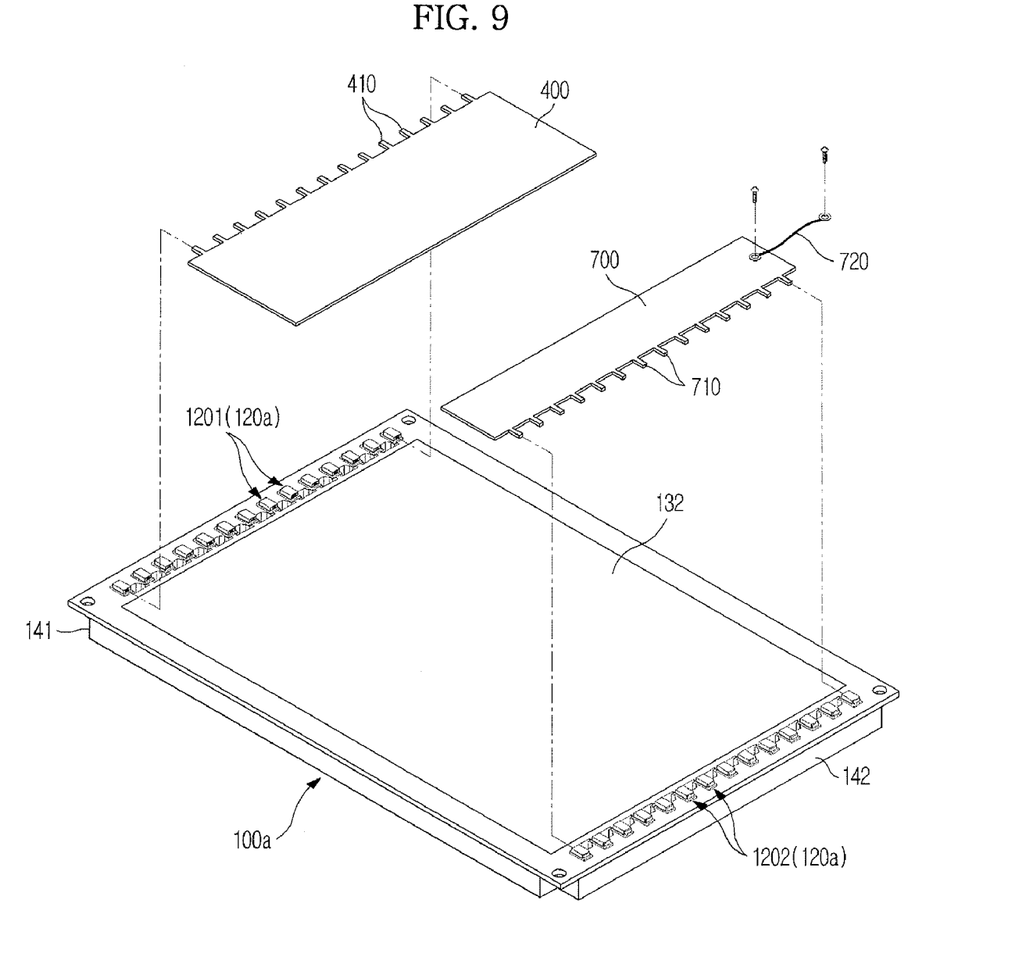
FIG. 9 is a perspective view illustrating a rear surface of a reflection plate, a power supply substrate, and a ground plate in the backlight assembly of FIG. 8.

FIG. 8 is a perspective view of a backlight assembly in accordance with an embodiment of the present general inventive concept, and FIG. 9 is a perspective view illustrating the rear surface of a reflection plate, a power supply substrate, and a ground plate in the backlight assembly of FIG. 8. In this embodiment, straight-type lamps are used as light sources.

As illustrated in FIGS. 8 and 9, a backlight assembly 30a includes a reflection plate 100a, straight-type lamps 200a arranged in a row on the reflection plate 100a, lamp sockets 300a respectively supporting both ends of the lamps 200a, a power supply substrate 400 to apply voltage to the lamps 200a, and a ground plate 700 to ground the lamps 200a.

Each of the straight-type lamps 200a includes a lamp body 240, a first electrode portion 250 provided at one end of the lamp body 240, and a second electrode portion 260 provided at the other end of the lamp body 240. The first electrode portion 250 is located close to the first side wall 141 of the reflection plate 100a, and the second electrode portion 260 is located close to the second side wall 142 of the reflection plate 100a.

The lamp sockets 300a are coupled with the first electrode portions 250 or the second electrode portions 260 of the lamps 200a, thus being electrically connected to the lamps 200a. The lamp sockets 300a connected to both ends of the lamps 200a have substantially the same constitution as that of the first lamp sockets 300 illustrated in FIG. 4. Hereinafter, for the convenience of description, the lamp sockets 300a connected to the first electrode portions 250 are indicated in reference numeral '301', and the lamp sockets 300a connected to the second electrode portions 260 are indicated in reference numeral '302'.

The reflection plate 100a is made of a resin having a good light reflectivity, and socket fixing units 120a are formed integrally with the bottom plane 131 of the reflection plate 100a.

This embodiment uses the straight-type lamps 200a, and thus the socket fixing units 120 are formed on the second side wall 142 also. The lamp sockets 301 are fixed to the socket fixing units 120 formed close to the first side wall 141, and the lamp sockets 302 are fixed to the socket fixing units 120 formed close to the second side wall 142. The socket fixing units 120a of this embodiment have substantially a same constitution as that of the socket fixing units 120 illustrated in FIG. 4. Hereinafter, for the convenience of description, the socket fixing units 120a, to which the lamp sockets 301 are fixed, are indicated in reference numeral '1201', and the socket fixing units 120a, to which the lamp sockets 302 are fixed, are indicated in reference numeral '1202'.

As illustrated in FIG. 9, the power supply plate 400 and the ground plate 700 are disposed on the rear surface 132 of the reflection plate 100a. The connection protrusions 410 of the power supply substrate 400 are inserted into connection grooves of the lamp sockets 301 (FIG. 8) through slots formed in the socket fixing units 1201, and thus are electrically connected to the lamp sockets 301.

The ground plate 700 is made of a conductive material. Similarly to the power supply substrate 400, the ground plate 700 includes connection protrusions 710. The connection protrusions 710 of the ground plate 700 are inserted into connection grooves of the lamp sockets 302 through slots formed in the socket fixing units 1202, and thus are electrically connected to the lamp sockets 302.

A ground wire 720 to electrically connect the ground plate 700 to a peripheral metal component may be connected to the ground plate 700. One end of the ground wire 720 is connected to the ground plate 700, and the other end of the ground wire 720 is connected to a metal frame (for example, the top chassis 70 illustrated in FIG. 2) located around the ground plate 700.

Figure 10:
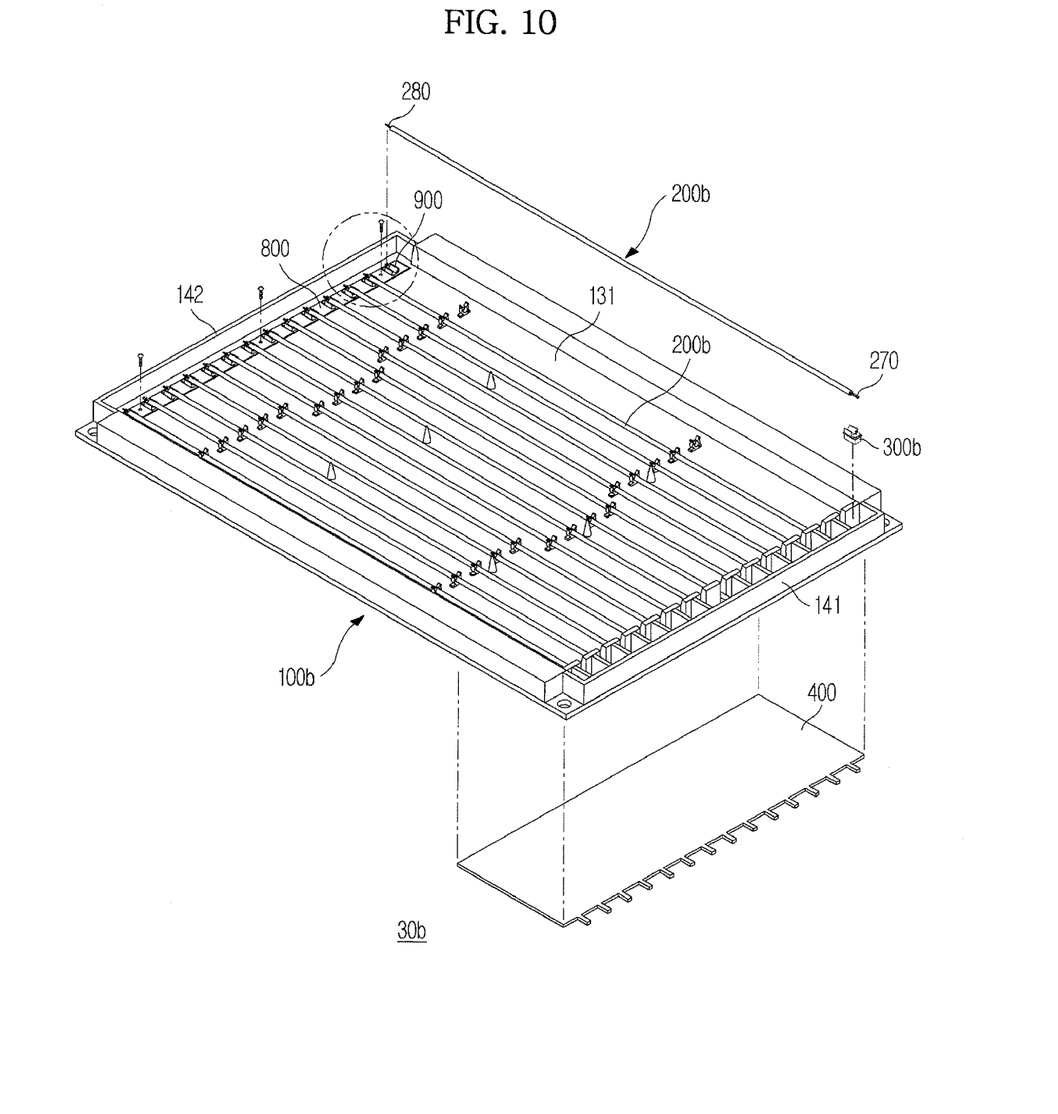
FIG. 10 is a perspective view illustrating a backlight assembly in accordance with an embodiment of the present general inventive concept.
Figure 11:
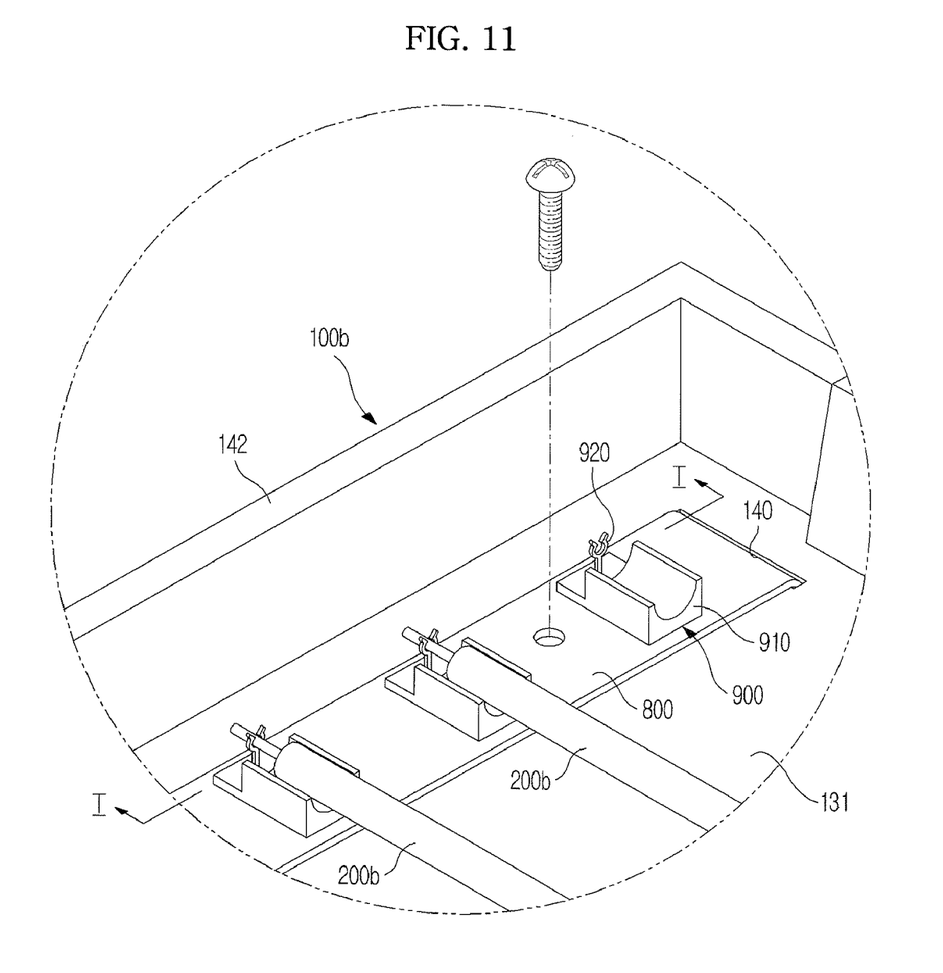
FIG. 11 is an enlarged view illustrating a portion of the backlight assembly of FIG. 10.
Figure 12:
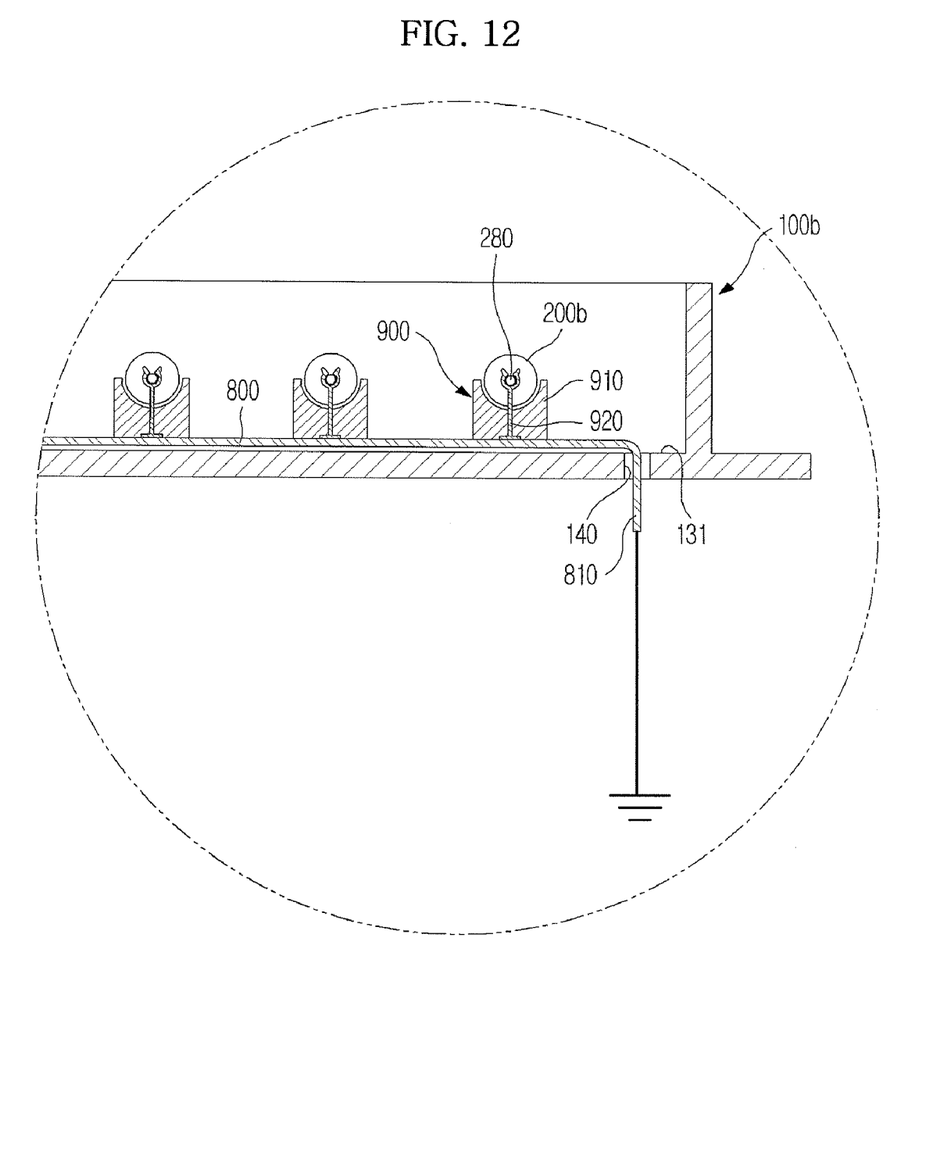
FIG. 12 is a cross-sectional view taken along the line I-I of FIG. 11.

FIG. 10 is a perspective view illustrating a backlight assembly in accordance with an embodiment of the present general inventive concept, FIG. 11 is an enlarged view of a portion of the backlight assembly of FIG. 10, and FIG. 12 is a cross-sectional view taken along the line I-I of FIG. 11.

As illustrated in FIGS. 10 to 12, a backlight assembly 30b includes a reflection plate 100b, straight-type lamps 200b arranged in a row on the reflection plate 100b, first lamp sockets 300b respectively supporting ends of the lamps 200b, a ground member 800 to ground the lamps 200b, and second lamp sockets 900 respectively supporting the other ends of the lamps 200b.

The reflection plate 100b is made of a resin having a good light reflectivity, and socket fixing units are formed integrally with the bottom plane 131 of the reflection plate 100b close to the first side wall 141.

First electrode portions 270 of the lamps 200b are respectively connected to the first lamp sockets 300b. The first lamp sockets 300b are respectively fixed to the socket fixing units of the reflection plate 100b, and are electrically connected to a power supply substrate 400 disposed on the rear surface of the reflection plate 100b. The first lamp sockets 300b and the socket fixing units of this embodiment have substantially the same constitutions as those of the first lamp sockets 300 and the socket fixing units 120 of FIG. 4.

Each of the second lamp sockets 900 includes a socket body 910, and a second connection member 920 disposed on the socket body 910. The socket body 910 is fixed to the ground member 800, and receives and supports the other end of each of the lamps 200b. One end of the second connection member 920 is electrically connected to a second electrode portion 280 of the lamp 200b. The other end of the second connection member 920 is extended toward the ground member 800, and thus is electrically connected to the ground member 800.

The ground member 800 is a conductive member, such as a metal plate, and is disposed on the bottom plane 131 of the reflection plate 100b close to the second side wall 142 of the reflection plate 100b. As illustrated in FIGS. 11 and 12, the ground member 800 includes an extension portion 810 extended to the outside of the reflection plate 100b. The reflection plate 100b is provided with a through hole 140 so that the extension portion 810 of the ground member 800 can pass through the reflection plate 100b via the through hole 140.

The extension portion 810 of the ground member 800 is electrically connected to a metal component (for example, the top chassis 70 of FIG. 2) disposed around the reflection plate 100b so that the lamps 200b can be grounded through the ground member 800. The extension portion 810 may be connected to a peripheral metal component through a separate ground wire. Further, the extension portion 810 may be extended up to a peripheral metal component and connected directly to the metal component.

As apparent from the above description, in a backlight assembly and a display device having the same in accordance with various embodiments of the present general inventive concept, structures to support or guide lamps are formed integrally with a reflection plate, thus to reduce a number of parts used and simplifying an assembly process.

Further, minimizing a number of parts added to ground lamps when a ground structure is formed on a reflection plate made of a nonconductive material, such as a resin is possible.

Although various embodiments of the present general inventive concept have been illustrated and described, it would be appreciated by those skilled in the art that changes may be made in these embodiments without departing from the principles and spirit of the present general inventive concept, the scope of which is defined in the claims and their equivalents.

What is claimed is:

1. A backlight assembly, comprising:
   a plurality of lamps to emit light;
   a plurality of lamp sockets to electrically connect to one or more ends of each of the plurality of lamps, respectively; and
   a reflection plate having a front surface to reflect the light emitted from the lamps, the reflection plate including socket fixing apertures to directly receive the plurality of lamp sockets, each of the socket fixing apertures including a socket fixing groove formed in the front surface of the reflection plate.

2. The backlight assembly according to claim 1, wherein the reflection plate is formed by injection molding using a resin having light reflectivity.

3. The backlight assembly according to claim 1, wherein:
   each of the lamp sockets includes a connection groove located within the socket fixing groove; and
   the socket fixing groove includes a slot to expose the connection groove to the outside.

4. The backlight assembly according to claim 3, further comprising:
   a substrate disposed on a rear surface of the reflection plate to supply power to the plurality of lamps,
   wherein the substrate includes connection protrusions, each of which is inserted into a respective connection groove through the slot of the socket fixing groove to be electrically connected to the connection groove.

5. The backlight assembly according to claim 1, wherein:
   each of the lamps includes a U-shaped bending portion; and
   the reflection plate includes lamp guide units formed integrally therewith, each of which guides the bending portion.

6. The backlight assembly according to claim 5, further comprising:
   lamp fixing members, each of which prevents movement of the bending portion.

7. The backlight assembly according to claim 3, further comprising:
   a ground plate disposed on a rear surface of the reflection plate to ground the lamps,
   wherein the ground plate includes connection protrusions, each of which is inserted into a respective connection groove through the slot of the socket fixing groove to be electrically connected to the connection groove.

8. The backlight assembly according to claim 1, wherein the backlight assembly further includes a ground member located on a rear surface of the reflection plate,
   the lamp sockets include first and second lamp sockets located at opposite ends of the reflection place, and
   the ground member is electrically connected to connection grooves of the second lamp sockets.

9. The backlight assembly according to claim 8, wherein the ground member includes an extension portion extended to the outside of the reflection plate.

10. The backlight assembly according to claim 1, wherein the reflection plate is formed by injection molding using a material obtained by adding glass fiber to polycarbonate.

11. The backlight assembly according to claim 10, wherein a ratio of the glass fiber added to the polycarbonate is in a range of 10% to 20%.

12. A display device, comprising:
    a front cover;
    a liquid crystal panel disposed at the rear of the front cover;
    a plurality of lamps to irradiate light onto the liquid crystal panel;
    first lamp sockets to be electrically connected to one end of each of the plurality of lamps, to support the lamps;
    a reflection plate including a front surface to reflect the light emitted from the lamps toward the liquid crystal panel, and socket fixing apertures formed at one side of the front surface of the reflection plate to directly receive the first lamp sockets, each of the socket fixing apertures including a socket fixing groove; and
    a rear cover disposed at a rear of the reflection plate.

13. The display device according to claim 12, wherein the reflection plate is formed by injection molding using a resin having light reflectivity.

14. The display device according to claim 12, further comprising:
    a ground member disposed at another side of the front surface and electrically connected to another end of each of the lamps.

15. The display device according to claim 14, wherein a through hole is formed through the reflection plate so that the ground member can be extended to the outside of the reflection plate via the through hole.

16. A backlight assembly usable with a display device, the backlight assembly comprising:
    a plurality of lamps to emit light;
    a reflection plate having a front surface to reflect light emitted from the lamps;
    a plurality of lamp sockets to be electrically connected to the plurality of lamps;
    socket fixing apertures formed in the front surface of the reflection plate to directly receive the lamp sockets, each of the socket fixing apertures including a socket fixing groove; and
    lamp guide units integrally formed with the reflection plate to guide a portion of the lamps.

17. The backlight assembly according to claim 16, further comprising:
    a grounding unit formed on the reflection plate to ground the lamps.

18. A backlight assembly usable with a display device and having a plurality of lamps to emit light to the display device, comprising:
    a refection plate to reflect light emitted from the lamps;
    lamp sockets to be electrically connected to the plurality of lamps; and
    lamp supporters to support the lamps and formed inside a bottom plane of the reflection plate,
    wherein the reflection plate includes a plurality of socket fixing apertures, each including a socket fixing groove, to directly receive the lamp sockets.

19. The backlight assembly according to claim 1, wherein each lamp socket includes a lamp receipt portion having a curved surface corresponding to an outside contour of a respective lamp and a connection member to be coupled with a protrusion extending linearly from one end of each of the lamps to electrically connect the lamp socket to the lamp.

20. The backlight assembly according to claim 4, wherein the lamp sockets include first lamp sockets located at one end of the reflection plate and connected to the substrate, and second lamp sockets located at an end of the reflection plate opposite the first lamp sockets, and the backlight assembly further comprises a ground plate located at an end of the backlight assembly opposite the substrate on the rear surface of the reflection plate to connect to the second lamp sockets.

21. The backlight assembly according to claim 1, further comprising:

a plurality of reflection surfaces extending from the front surface of the reflection plate to form an acute angle with the front surface of the reflection plate, the plurality of reflection surfaces separated by spaces in which the plurality of lamps are positioned to be connected to the plurality of lamp sockets.

* * * * *